March 18, 1952  W. ELNICKY  2,589,543

CABLE SHORTENING DEVICE

Filed April 9, 1949

INVENTOR
WILLIAM ELNICKY
BY
Fetherstonhaugh & Co.
ATTORNEYS

Patented Mar. 18, 1952

2,589,543

UNITED STATES PATENT OFFICE 2,589,543

CABLE SHORTENING DEVICE

William Elnicky, Vancouver, British Columbia, Canada

Application April 9, 1949, Serial No. 86,557

7 Claims. (Cl. 24—71.1)

This invention relates to an improved device for shortening or tightening cables which are subject to strain and are liable to stretch.

This device is particularly designed for use on brake cables of vehicles, but it is to be understood that it may be used for any other desired purposes.

An object of the present invention is the provision of a cable shortening or tightening device which may be used in connection with any cable without cutting the latter.

Another object is the provision of a cable shortening device which may be applied to a cable without removing either end thereof from the object to which it is connected.

This device consists of a frame having a stationary bearing and a bearing surface close to each other. The device is applied to a cable to be shortened with the stationary bearing over the cable and the bearing surface under said cable. A pressure bearing is movably mounted on the body in any convenient manner and it is adapted to fit over the cable. This pressure bearing is movable in an arcuate path over the bearing surface and away from the stationary bearing. This action forms a loop in the cable, thus shortening it. The degree of shortening depends upon the amount of movement of the pressure bearing from the stationary bearing. Suitable means is provided for locking the pressure bearing in different positions relative to the stationary bearing.

Figure 1:
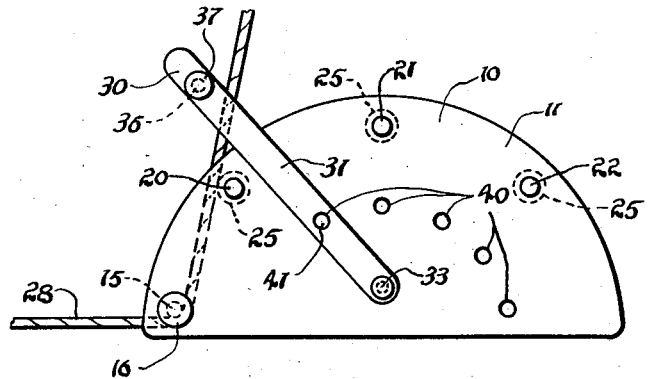
Figure 2:
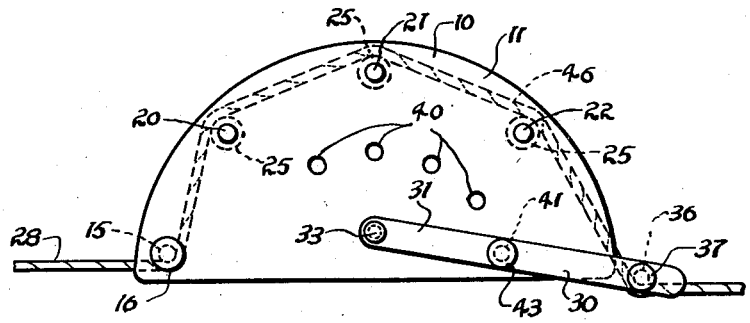
Figure 3:
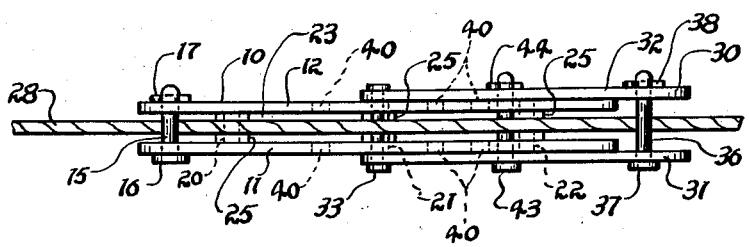

An example of this invention is illustrated in the accompanying drawings, in which, Figure 1 is a side elevation of the cable shortening device applied to a cable before shortening the latter, Figure 2 is a similar elevation of the device with the cable shortened to the maximum amount, and Figure 3 is a plan view of the device set as shown in Figure 2.

Referring to the drawings, 10 is a frame which may consist of two spaced-apart side plates 11 and 12. These plates may be of any desired shape, but in this example, they are semicircular. A stationary bearing 15 is mounted on the frame adjacent one end thereof. This bearing is preferably in the form of a pin 16 removably extending through the side plates and held in position in any suitable manner, such as by means of a cotter pin 17. A bearing surface is provided in the frame adjacent the bearing 15. This surface may be in the form of a single pin 20 extending between the side plates 11 and 12, but it is preferably outlined by spaced pins 20, 21, and 22 extending between said side plates. These pins are arranged in an arcuate path and they are spaced inwardly from the edges of the plates so that the latter form a channel 23 over the bearing surface or pins. Spacers in the form of sleeves 25 may be mounted on the bearing pins 20, 21, and 22 to keep the side plates apart and to provide the bearing surface. While three bearing pins have been shown, it is to be understood that any desired number may be employed, or that a continuous surface may be used which would extend from approximately the pin 20 to the pin 22.

A pressure bearing is movably mounted on the body and is adapted to co-operate with the stationary bearing and the bearing surface to form a loop in the cable 28, said cable being placed under the stationary bearing and over the bearing surface, as shown in the drawings. In this example, an arm 30 consisting of spaced side members 31 and 32 is provided. This arm is pivotally mounted on the frame 10 at 33 and extends outwardly beyond the edge of the body and the stationary bearing and the bearing surface. A pressure bearing 36 is carried by the arm 30 over or beyond the bearing surface. This pressure bearing may be in the form of a pin 37 extending through the side members 31 and 32 of the arm and removably held in place in any convenient manner, such as by means of a cotter pin 38. The pressure bearing is adapted to fit over the cable 28.

Suitable means is provided for locking the arm 30 and, consequently, the pressure bearing 36 in different positions relative to the stationary bearing and the bearing surface. One way of doing this is to provide a plurality of holes 40 in the frame 10 arranged in a circular path, the center point of which is the pivot 33. Another hole 41 is provided in the arm 30 which is adapted to register with any of the body holes 40. A pin 43 may be inserted through the arm hole and any body hole to lock the arm in different positions. In this example, there are aligned holes 40 in the side plates of the body, and aligned holes 41 in the side members 31 and 32 of the arm. The pin 43 is moved through the holes 41 and one set of body holes 40 and is removably held in place by a cotter pin 44.

In order to use this cable shortening or tightening device, the stationary bearing 15 is removed, and the frame 10 is applied to the cable with the latter lying in the channel 23. Then the stationary bearing is replaced. The cable now lies under the stationary bearing and over the pin 20 of the bearing surface. The pressure bearing 36 is removed from the arm 30 and the latter is swung until the side members thereof fit over the cable, at which time the pressure bearing is replaced over said cable. When the device is set as shown in Figure 1, it is ready to shorten or take up the slack in the cable. The arm is now moved so that the pressure bearing is moved away from the stationary bearing. This wraps the cable around the bearing surface. If the arm is moved only a little distance, the cable may be wrapped around the pin 20 only. However, as the pressure bearing moves away from the stationary bearing, the cable is progressively pressed over the pins 21 and 22, the maximum shortening of the cable being achieved when the pressure bearing arrives at the position shown in Figure 2. At this time, the cable extends under the bearing 15 at one end of the device and in the form of a loop 46 over the bearing surface consisting of the pins 20, 21, and 22, and under the pressure bearing at the opposite end of the device. The pin 43 may be inserted through the holes of the arm and any of the body holes to lock the pressure bearing in any adusted position relative to the stationary bearing.

From the above it will readily be seen that if a cable extending between two points is stretched, this device may be used to take up the slack. In all probability, the locking pin 43 will be inserted through body holes relatively close to the stationary bearing. If the cable stretches any further, it is a simple matter to move the pressure bearing farther away from the stationary bearing to take up the additional slack.

What I claim as my invention is:

1. A device for tightening brake cables and the like at any point throughout the length thereof, comprising a frame, a stationary bearing removably mounted in the frame, an arcuate bearing surface in the frame to one side of and in the same plane as said bearing, a portion of the cable to be tightened being placed under the stationary bearing and over the bearing surface, an arm pivotally mounted on the frame beneath the bearing surface and extending outwardly beyond said surface, a pressure bearing removably carried by the arm over the bearing surface adapted to fit over the cable, and means for locking the arm in different positions relative to the stationary bearing.

2. A device for tightening brake cables and the like at any point throughout the length thereof, comprising a frame, at least two bearings in the frame, one of said bearings being adapted to fit over a cable to be tightened and the other under said cable, a pressure bearing movably mounted on the frame adapted to fit over the cable on the part thereof on the side of the underneath bearing remote from the other over bearing, said pressure bearing being movable away from the other bearings in an arcuate path, and means for locking the pressure bearing in different positions relative to the under bearing.

3. A device for tightening brake cables and the like at any point throughout the length thereof, comprising a frame formed of two spaced-apart side plates, a stationary bearing extending between the plates, a bearing surface between the plates spaced from the edges thereof and in the same plane as said bearing, said surface forming the bottom of a channel opening outwardly from the frame edge, the cable to be tightened being placed under the stationary bearing and over the bearing surface in the channel between the plates, an arm pivotally mounted on the frame beneath the bearing surface and extending outwardly beyond said surface, a pressure bearing carried by the arm over the bearing surface adapted to fit over the cable, and means for locking the arm in different positions relative to the stationary bearing.

4. A device for tightening brake cables and the like at any point throughout the length thereof, comprising a frame, a channel in an edge of the frame opening outwardly therefrom, a stationary bearing mounted in the frame adjacent one end of the channel, a bearing surface in the frame to one side of and in the same plane as said bearing, said surface forming a bottom for the channel, the cable to be tightened being placed under the stationary bearing and over the bearing surface, an arm pivotally mounted on the frame beneath the bearing surface and extending outwardly beyond said surface, a pressure bearing carried by the arm over the bearing surface adapted to fit over the cable, a plurality of holes in the frame adjacent the arm arranged in a circular path, a hole in the arm adapted to register with any of the frame holes, and a pin to be inserted through the arm hole and any frame hole to lock the arm in different positions relative to the stationary bearing.

5. A device for tightening brake cables and the like at any point throughout the length thereof, comprising a frame formed of two spaced-apart side plates having adjacent curved edges, an arm pivotally mounted on the frame and projecting beyond the curved edge thereof, a pressure bearing pin removably mounted in the arm beyond the frame, a stationary bearing pin removably extending through the plates at one end of the curved edges thereof, an arcuate bearing surface between the plates near said curved edges, the center of curvature of the arcuate surface substantially coinciding with the pivot point of the arm, and means for locking the arm with its pressure bearing pin in different positions relative to the stationary bearing pin.

6. A device for tightening brake cables and the like at any point throughout the length thereof, comprising a frame formed of two spaced-apart side plates having adjacent curved edges, an arm pivotally mounted on the frame and projecting beyond the curved edge thereof, a pressure bearing pin removably mounted in the arm beyond the frame, a stationary bearing pin removably extending through the plates at one end of the curved edges thereof, a plurality of spaced pins extending between the plates at the curved edges thereof and arranged in an arcuate path, the centre of curvature of said path substantially coinciding with the pivot point of the arm, and means for locking the arm with its pressure bearing pin in different positions relative to the stationary bearing pin.

7. A device for tightening brake cables and the like at any point throughout the length thereof, comprising a frame formed of two spaced-apart side plates having adjacent curved edges, an arm pivotally mounted on the frame and projecting beyond the curved edge thereof, a pressure bearing pin removably mounted in the arm beyond the frame, a stationary bearing pin removably extending through the plates at one end of the curved edges thereof, a plurality of spaced pins extending between the plates arranged in an arcuate path the centre of curvature of which substantailly coincides with the pivot point of the arm, said spaced pins being spaced inwardly from the curved plate edges to form a channel therebetween, a plurality of aligned holes in the plates arranged in a circular path about the arm pivot point, a hole in the arm adapted to register with any of the aligned plate holes, and a pin to be inserted through the arm hole and any of the aligned plate holes to lock the pressure bearing pin of the arm in different positions relative to the stationary bearing pin.

WILLIAM ELNICKY.

REFERENCES CITED

The following references are of record in the file of this patent:

UNITED STATES PATENTS

| Number | Name | Date |
|---|---|---|
| 673,472 | Nichols | May 7, 1901 |
| 1,570,607 | Bashline | Jan. 26, 1926 |
| 1,982,444 | Miller | Nov. 27, 1934 |

FOREIGN PATENTS

| Number | Country | Date |
|---|---|---|
| 22,601 | Norway | Sept. 23, 1912 |